United States Patent [19]

Kaeseler

[11] Patent Number: 4,682,487
[45] Date of Patent: Jul. 28, 1987

[54] METHOD FOR RECONDITIONING SPOT WELDING ELECTRODES

[76] Inventor: Werner Kaeseler, Meisenweg 8, D-3507 Baunatal-Altenritte, Fed. Rep. of Germany

[21] Appl. No.: 829,569

[22] Filed: Feb. 14, 1986

Related U.S. Application Data

[63] Continuation of Ser. No. 591,923, Mar. 21, 1984, abandoned.

[30] Foreign Application Priority Data

Mar. 23, 1983 [DE] Fed. Rep. of Germany ....... 3310423

[51] Int. Cl.⁴ ..................... B21D 22/00; B23K 11/30; B23K 35/00
[52] U.S. Cl. ........................................ 72/354; 72/356; 72/359; 219/119
[58] Field of Search ......................... 72/354, 356, 359; 219/119, 120

[56] References Cited

U.S. PATENT DOCUMENTS 2,363,815 11/1944 Stone ..................................... 72/354
2,774,859 12/1956 Johnson .............................. 219/120
4,170,890 10/1979 Kojima ................................... 72/359
4,423,617 1/1984 Nippert ................................. 72/356

Primary Examiner—Robert L. Spruill
Assistant Examiner—Steve Katz

[57] ABSTRACT

A method and an apparatus for reconditioning worn electrodes for resistance welding. The worn electrodes are pressed into a die by a punch and thus restored to their original shape or given a different shape.

1 Claim, 14 Drawing Figures

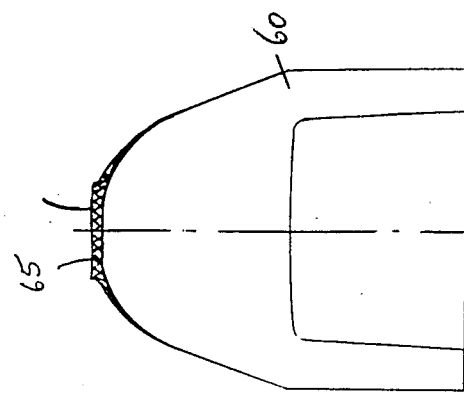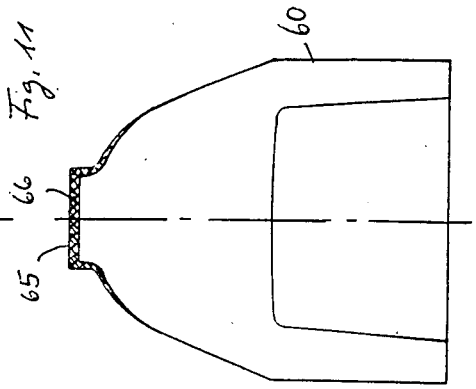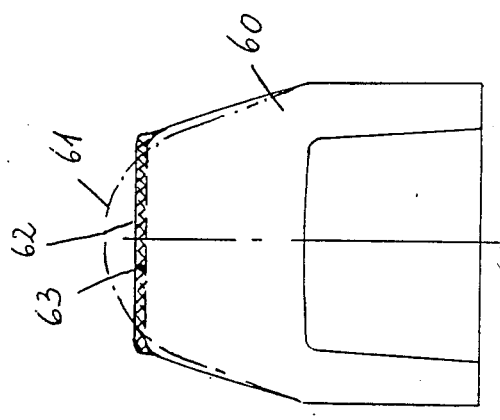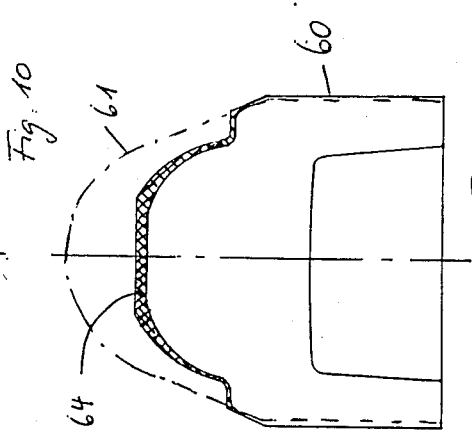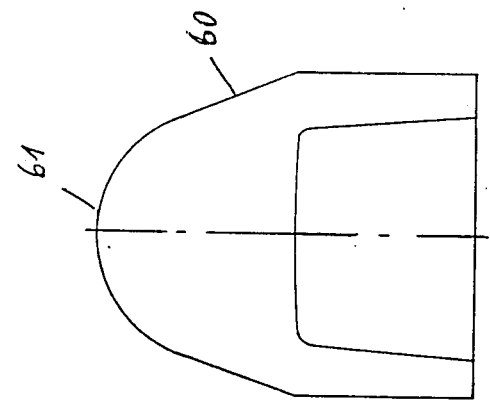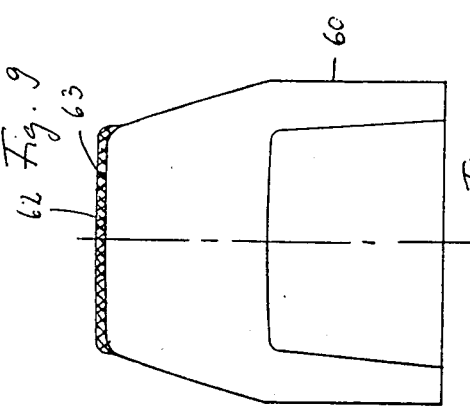

METHOD FOR RECONDITIONING SPOT WELDING ELECTRODES

This application is a continuation of application Ser. No. 591,923, filed Mar. 21, 1984 and now abandoned.

BACKGROUND OF THE INVENTION

The invention relates to a method and an apparatus for reconditioning worn-out electrical spot welding electrodes by means of a reshaping tool.

As a consequence of the pressure exerted on spot welding electrodes in their operation, and of the high temperatures to which they are exposed, the working surface of the electrodes is gradually deformed, especially in the sense of an enlargement of cross section at the usually conical, cylindrical, rounded or hemispherical tips of the electrodes. This is true even when, instead of fixedly mounted welding electrodes, replaceable, cap-like electrodes are used, which are replaceably fastened to mating electrode holders of the welding apparatus. Such surface deformations result in poor welds and hence in an impairment of product quality, and also in spattering during the spot welding operation. As a result, such electrodes have to be removed and replaced with new electrodes.

Until now, spot welding electrodes, especially cap-like electrodes of this kind, have been considered a disposable product. After a certain number of, for example, 2,000 to 15,000 welds, they are replaced and discarded as scrap metal. The cost of this practice is appreciable.

To reduce the consumption of new spot welding electrodes it is already known to recondition them, without removing them from the welding machine, by means of an annular shaping tool which is manually rotated one or more times about the electrode as center (French Patent No. 936,105). In this procedure, the manual rotation of the shaping tool is extremely difficult on account of the great amount of friction it entails, and on the other hand it takes a great number of rotations of the shaping tool to regain to any degree the desired shape of the reconditioned welding electrode. Moreover, the use of this known process is not easily possible on automatic welding assembly lines. Lastly, the quality of the spot welding electrodes reconditioned in this manner is very poor.

In the case of roller seam welding it is already known to remove the burrs that form on continuously revolving electrode rollers, or to prevent their formation, by means of rollers which constantly act on the welding surfaces (British Patent No. 282,960). This process, however, cannot be applied to the spot welding art.

It is furthermore known to recondition worn spot welding electrodes by machining operations such as turning, filing or milling, whereby the flattened and broadened working surfaces are restored to their initial state by cutting operations. Reconditioning processes of this kind, however, have not yet produced useful results. Furthermore, they are not feasible from the economic point of view.

It is furthermore known ("Schweisstechnik" 1968, vol. 1, pp. 17–20) that, in order to determine the useful life of spot welding electrodes, allowance must be made for the work-hardening of the contact surfaces that occurs during the first 1000 spot welds, and that the useful life of electrodes made from copper-chromium alloys can be substantially improved if the electrodes are made, not by machining, but by cold plastic deformation. Lastly, it is known ("DVS-Berichte Band 70" 1981, pp. 85–100) to produce electrode caps by cold plastic deformation. Processes such as these, however, have never previously been used for the reconditioning of worn spot welding electrodes.

It is the object of the invention to further develop the method and the apparatus of the kind referred to above to such a degree that the reconditioning of spot welding electrodes will be more economical and the reconditioned electrodes will be at least comparable in quality to new spot welding electrodes.

The method of the invention is characterized by pressing the worn spot welding electrode by means of a punch into a cavity formed in a die whose shape corresponds to the shape desired in the reconditioned spot welding electrode, doing so in such a manner that its working surface assumes the shape provided by the cavity, and such that the diffusion layers and/or alloy layers built up by previous use on and/or directly beneath the active working surface of the worn electrode will be preserved and will again be present on and/or directly beneath the active working surface of the reconditioned electrode.

BRIEF DESCRIPTION OF THE INVENTION

An apparatus for the reconditioning of worn spot welding electrodes by means of a reshaping tool is characterized in accordance with the invention by having a reshaping means in the form of a press whose reshaping tool is a die having a cavity corresponding to the shape of the reconditioned spot welding electrode, and a floatingly mounted punch for pressing the worn spot welding electrode into the die.

The invention offers the advantage that the reconditioned spot welding electrodes are not only comparable to new spot welding electrodes and even produce better welding results than the latter, but also, in contrast to the spot welding electrodes reconditioned by other methods, they can be reconditioned and reused as often as ten times. Moreover, several hundred worn electrodes can be reconditioned per hour with the apparatus of the invention, so that the method of the invention offers great economic advantages.

The invention is based on the knowledge that complex chemical and/or metallurgical processes take place in the use of spot welding electrodes, and that the work hardening that can be achieved by shaping them is less important than the diffusion layers or alloy layers that form during the welding directly on and a few microns beneath the actual working surface of the electrode, i.e., the surface involved in the welding operation. Essentially what is involved is iron, aluminum and/or zinc penetrating into the working surface, and carbon which deposits itself on the working surface. The invention therefore provides for maintaining these layers in the reconditioning of the electrodes, and for conducting the reshaping process such that these layers will be situated on or just below what will be the active working surface after the reconditioning of the electrode. The elements mentioned may also be present in oxide form.

The invention will now be explained in conjunction with an embodiment represented in the appended drawing.

DESCRIPTION OF THE DRAWING

FIG. 1 shows an especially typical and frequently-used electrode cap 1, which consists of a copper-chromium-zirconium compound. It contains a substantially cylindrical sleeve 2 which is placed on the electrode holder (electrode mandrel) of a welding apparatus and is cooled conventionally by water or the like which is pumped through its internal, tapered or cylindrical bore 3 or only through an internal bore in the electrode mandrel. The free end of the sleeve 2 adjoins a solid hemispherical dome 4 whose apex forms the working surface 5 of the electrode cap.

FIG. 3 shows a worn-out electrode cap 7, which results after, for example, two thousand to fifteen thousand spot welds performed by the electrode caps of FIGS. 1 or 2. It has a working surface 7, considerably flattened and broadened by heat and pressure, which in the welding process tends to spatter and no longer produces sufficiently good cupping.

FIG. 4 shows another electrode cap 8, which differs from the caps of FIGS. 1 and 3 substantially in that its tip 9 has a virtually planar, offset working surface 10. FIG. 5 shows an electrode cap 11 having on its free end a short, cylindrical projection 12 whose outer end presents a circular working surface 13. In addition, there are a number of additional shapes of electrode caps having different tips and working surfaces according to their application, which have to be replaced after a certain number of welds, due to the wearing out of the working surfaces.

Figure 6:
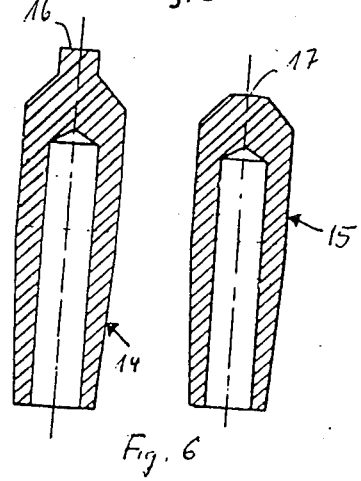

Instead of the electrode caps illustrated, special electrodes 14 and 15 (FIG. 6) of substantially greater length can be provided, whose working surfaces 16 and 17, however, wear out in the same manner, and which are provided with cylindrical bores to accommodate cooling tubes. Also, a great number of alloys other than copper-chromium-zirconium alloys are used, depending on the materials being welded.

Figure 3:
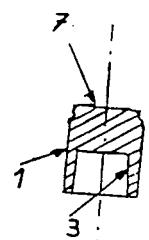
Figure 4:
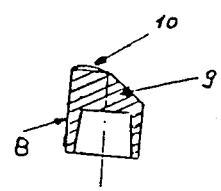
Figure 7:
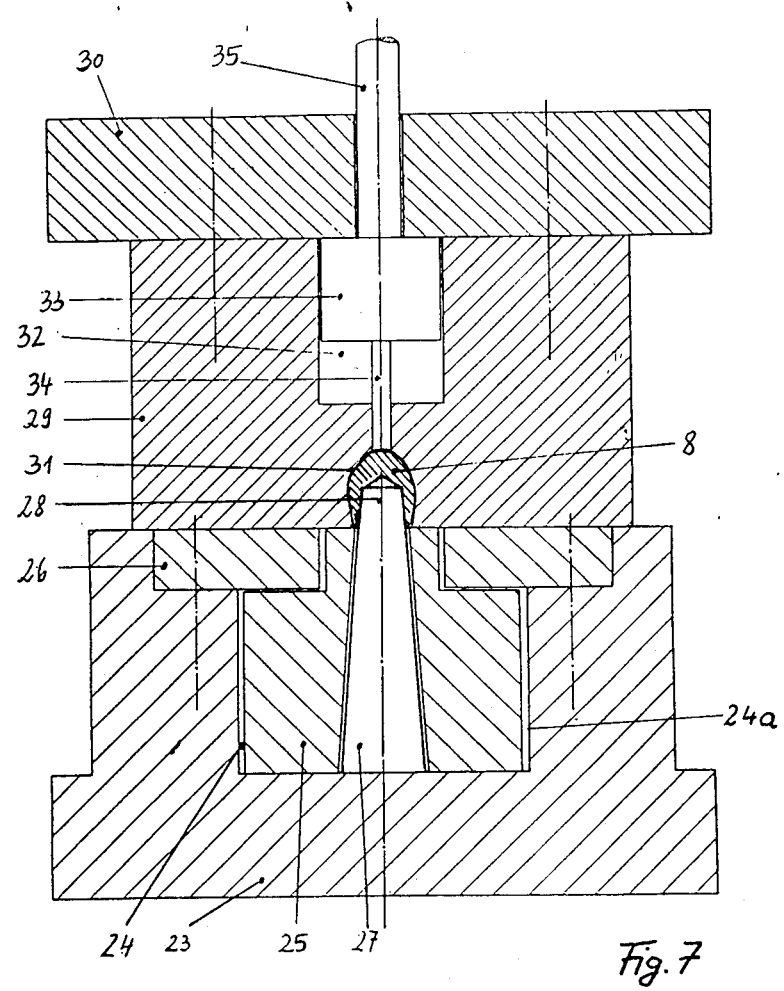
FIG. 7 represents a device of the invention for the reconditioning of the electrode caps of FIGS. 1 to 5.

FIG. 7 shows an apparatus in accordance with the invention for the reconditioning of the worn electrode caps of FIG. 3 by reshaping. This apparatus contains as its chief component a press of the kind that is commonly used in the shaping operations required in the art of the plastic deformation of metals. It can be a hydraulic press or a mechanical excentric or crank press, or a plastic-flow pressing machine. It contains, for example, a ram, which is not shown, and which can be moved up and down by an eccentric or crank drive, which is not shown, and it bears a punch holding plate 23. The punch holding plate 23 has a recess 24 in which a punch socket 25 is mounted with an anular gap 24a between the punch socket and the wall of the recess so that the punch socket 25 is laterally floatingly mounted and is held in place by means of a retaining ring 26. In the punch socket 25 there is held a punch 27 whose head 28, extending above the retaining ring 26, has an external cross section which corresponds to the internal bore 3 in the worn-out electrode cap 1, which bore extends all the way to the body 4 of the cap.

The punch 27 is opposite a die 29 which is fastened to a backing plate 30, which is fixed for example. The die 29 has on its side facing the punch 27 a cavity 31 which precisely corresponds in shape to the shape which the exterior of the electrode cap 1 is to be given. In a rear portion of the die 29 there is provided a recess 32 in which an ejector 33 with an ejection pin 34 is displaceably disposed, the ejection pin being guided in a bore reaching all the way to the cavity 31. On the back of the ejector 33 there is fastened a rod 35 which is guided in the backing plate 30 and is connected to a mechanism for actuating the ejector 33.

To rebuild a worn electrode cap 8, the latter is first placed with its bore 3 on the head 28 of the punch 27 in the manner seen in FIG. 7. Then the punch holding plate 23 is raised, causing the top end of the worn electrode cap 8 to enter into the cavity 31 of the die 29, and the worn electrode cap 8 is reshaped to conform to the shape established by the cavity 31. This process is referred to in the metal forming art as flow pressing, and, in contrast to a machining operation, it is performed without any loss of weight. After the reshaping operation, the punch 27 is lowered again and the electrode cap is ejected by means of the ejector 33. The reconditioned electrode cap can then be immediately reused.

Although the cavity 31 is adapted to the standard external shape of the electrode caps and the internal cross section of bore 3 has a standard, cylindrical or tapered configuration, it is possible for the axis of bore 3 to be out of line with the axis of the external shape of the electrode cap. This eccentricity can be a consequence, for example, of irregular wall thickness in the electrode caps, and its normal consequence may be that the punch 27 will soon be destroyed at the high pressures used, of, for example, 3 to $6 \times 10^4$ kp. This, however, is prevented by the free-floating manner in which the punch 27 or of the punch socket 25 is mounted, since the punch can shift laterally as the electrode cap 8 penetrates into the cavity 31 if the axis of bore 3 is not in alignment with the axis of the cavity 31.

Instead of the above-described press, presses having a plurality of punches and dies can be provided, or those having round tables which permit an automation of the insertion, reshaping and ejecting operations. Moreover, presses can be provided which have a fixed punch and a movable die or movable punches and dies. Lastly, it would be desirable to provide the punch 27 and/or the punch socket 25 with a rim or shoulder to engage the cylindrical circumferential bottom margin of the inserted electrode cap so as to prevent the formation of a flash in this area.

Figure 1:
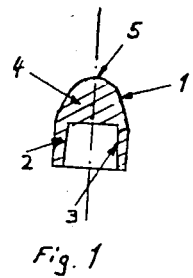
FIGS. 1 to 6 are cross sections taken through a number of electrodes which can be reconditioned by the method of the invention.
Figure 2:

In the case of the procedure described in conjunction with FIG. 7, the electrode cap is reconditioned in a onestep process. The danger exists that the dome 4 (FIG. 1) may be made increasingly thinner and the blind bore 3 increasingly longer by repeated reconditioning, ultimately rendering the electrode cap unusable. Also, this leads to problems in the reconditioning of electrode caps which have been reconditioned different numbers of times.

Figure 8:
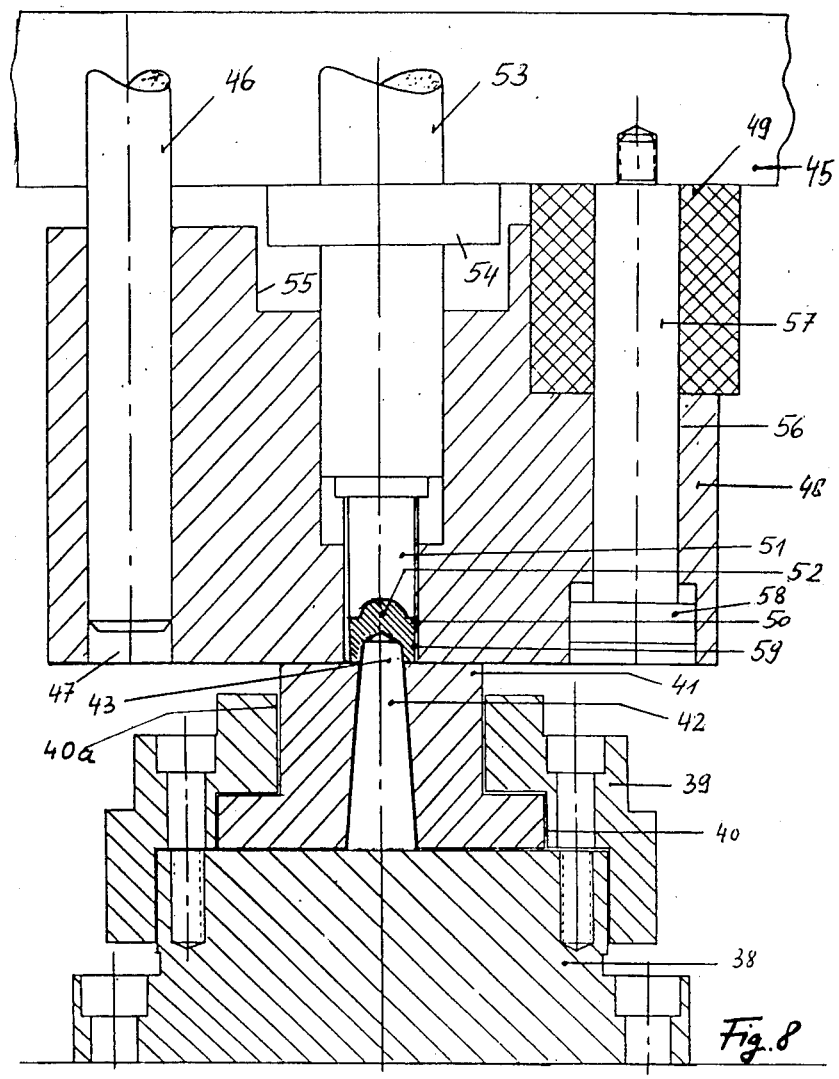
FIG. 8 shows a modified embodiment of the device of FIG. 7, and FIGS. 9 to 14 represent diagrammatically the reconditioning of worn electrodes in accordance with the invention.

In accordance with the invention, therefore, a two-step reconditioning method is proposed, in whose first step the apparatus of FIG. 8 is used in order first to upset all electrode caps such that they assume a shape independent of their prior history, and in whose second step the apparatus of FIG. 7 is used in the manner previously described.

The apparatus of FIG. 8 contains a fixed centering plate 38 to which a punch holding disk 39 is fastened, which has a recess 40 in which a punch socket 41 is mounted with an annular gap 40a between the punch socket and the wall of the recess 40 so that the punch socket 41 is laterally floatingly mounted and axially fixed. The punch socket 41 holds a punch 42 whose head 43 extending above the punch socket has an external cross section which is slightly smaller than the internal cross section of the bores 3 of the electrode caps that are to be reconditioned, but is sufficiently large for the head 28 of the punch 27 to be introduced into the bore 3 in the second step. Moreover, the head 43 projects slightly less above the punch socket 41 than the punch head in FIG. 7. After an electrode cap has been placed on the punch, therefore, there will remain a slight clearance not only between the end of head 43 and the domed solid portion 4 but also between the circumference of head 43 and the internal periphery of the sleeve 2 of the electrode cap.

The apparatus of FIG. 8 furthermore has a die holding plate 45 which is fastened to the ram of the excentric press or the like, and has guiding posts 46 which are disposed parallel to the die's direction of movement and extend toward the punch socket 41. On these guiding posts 46 there is displaceably mounted by means of bores 47 a die 48 which is held by means of springs 49, such as rubber cushions or plate springs, normally at a distance from the die holding plate 45, but is able to be brought against the latter against the force of springs 49. The die 48 has a central bore 50 whose cross section corresponds to or is slightly greater than the cross section of the sleeve of the electrode caps to be reconditioned. Moreover, the die 48 is provided with a die portion 51 displaceably mounted in the bore 50 and having a cross section corresponding to the latter, which die portion 51 has at its end facing the punch 42 a rimmed concavity 52 and is fastened at its opposite end to a guiding plunger 53 which is mounted in a coaxial prolongation of the bore 50, has a collar 54, and at its upper end is displaceably mounted in the die holding plate 45. The collar 54 is mounted in a recess 55 of the die 48 such that, when the die holding plate 45 is lowered, it will be carried along by the latter, and when the die holding plate 45 is raised it will engage the die 48 and then be carried along by the latter. Finally, the die 48 has a bore 56 coaxial with bore 50, and a lifting bolt 57 which passes through bore 56 and is fastened to the die holding plate 45. This lifting bolt 57 has on its end facing the punch socket a head 58 which is disposed in a wider portion of bore 56.

In order to recondition an electrode cap 59, the cap is first placed with its bore on the head 43 of the punch 42. Then the die holding plate 45 is lowered until the die 48 engages the punch socket 41 and the electrode cap 59 is within the bore 50. The die portion 51 is at this moment still at a distance away from the electrode cap. As the die holding plate 45 continues its descent, first the spring 49 is compressed, until finally the die portion 51 brings its concave bottom onto the electrode cap 59. As the die holding plate 45 continues to advance, the electrode cap 59 will therefore be upset to the shape visible in FIG. 8. The die holding plate 45 acts during this upsetting process on the collar 54 of the guiding plunger 53.

Then the die holding plate 45 is raised again, allowing the spring 49 to be relieved, and then the die 48 is pulled up by the lifting bolt 57. If in this case the guiding plunger 53 is held fast, the collar 54 will remain in its lowermost position so that the electrode cap 59 located in the bore 50 will be ejected downwardly by the die portion 51. Lastly, the guiding plunger is released again, so that the collar will be engaged by the die as the latter ascends and will be carried upwardly with it in order to free the head 43 of punch 42 for the insertion of the next electrode cap. This completes the first step of the method of the invention.

Figure 5:
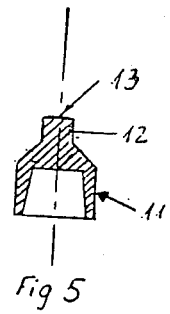

The electrode caps prepared by means of the apparatus of FIG. 8, whose shape is independent of their previous history, especially the number of times they have previously been reconditioned, are then inserted into the apparatus of FIG. 7 where they are processed in the manner previously described, so that they will assume the shape established by the cavity 31 of the die 29. Upon the completion of this second step of the method of the invention, the electrode cap has been fully reconditioned. Basically, it matters not whether the electrode caps have the same external shape after reconditioning as they had originally, or whether they assume some other desired shape. A different shape could be obtained, for example, by holding the ejector pin 34 in a slightly withdrawn position while the punch 27 is being raised. The result of this would be that the electrode cap 8 would not only assume the shape established by the die, but would also be provided with the projection 12 seen in FIG. 5.

It is essential for the method of the invention that the shaping in the die be performed such that the diffusion layers and/or aloy layers obtained in the previous welding operation, or the coatings deposited on the active working surface, be largely preserved. FIGS. 9 to 14 show this diagrammatically. In FIG. 9, a new electrode cap 60 is represented, whose active working surface 61 is slightly rounded and still free of any alloy or diffusion layers. In FIG. 10 the same electrode cap 60 is shown after it has worn out. It contains a flattened working surface 62 (the original working surface 61 is represented by a broken line), and just below the working surface 62 an alloy layer and/or a diffusion layer 63 has formed, since, depending on the kind of sheet metal being welded and its surface coatings, iron, copper, aluminum, zinc, chromium, lead or the like have diffused below the surface to a depth of for example twenty to fifty microns and there they have formed alloys or oxides. Furthermore, carbon may have also been deposited on the working surface 62 in a thickness of for example two microns. Lastly, in FIG. 11, the electrode cap 60 is represented after the one-step reconditioning with the apparatus of FIG. 7. It contains a new active working surface 64 and a diffusion and alloy layer 65 underneath it. The important thing is that the material forming the alloy and diffusion layer 63 flow back largely to the apex of the electrode cap during the cold flow pressing operation, and be thus preserved, i.e., that the layer 65 consist of a portion of the layer 63. The reconditioned electrode cap 60 therefore has, in the active area of its working surface 64, all of the properties which are advantageous for its reuse.

FIGS. 12 to 14 indicate diagrammatically the circumstances involved in the practice of the two-step process. In FIG. 12, the electrode cap 60 is again shown after wearing out (cf. also FIG. 10). FIG. 13 shows the same electrode cap 60 after treatment with the apparatus of FIG. 8, in which it has been subjected to an axial upsetting operation and has been slightly expanded radially. During this operation the diffusion and alloy layers 63 have simply been depressed, i.e., the upset electrode has on its surface a layer 64 which corresponds in its properties to the layer 63, but it is in a different shape. Lastly, FIG. 14 shows the electrode cap 60 after its additional treatment in the apparatus of FIG. 7. It now contains an active working surface 65 having diffusion and alloy layers beneath it. These layers 66 represent a portion of the diffusion and alloy layers 63 and 64, respectively, and therefore have the same properties as the latter, as is desired for the welding operations that follow. Similar conditions are obtained in the case of carbon layers deposited on the working surfaces, which layers are not separately indicated in FIGS. 11 to 14.

It is assumed that advantages of the invention can be explained as follows:

Inasmuch as the electrode caps during the welding process are constantly in contact with the metals being welded, metal and, in some cases, carbon particles diffuse into their working surfaces, while on the other hand, oils and other impurities present on the sheet metal surfaces are carbonized by the high temperatures and cause carbon deposits on the working surfaces. One consequence of this is changes in the contact resistances and hardening in the area of the active portions of the working surfaces. These processes take place only during the first two or three hundred welds, until a kind of saturation has taken place, and they then lead to a steady state in the active area of the working surfaces of the electrode caps. Another consequence of such diffusion and alloying processes is that the hardness of the electrode caps directly at their working surfaces is greater even after a few welds than the initial hardness of the alloy consisting of, for example, copper, chromium and zirconium, while at slight distances away from the working surface of the electrode caps, so-called hardness sinks form, in which the hardness is substantially less than the initial hardness. A new electrode cap therefore does not operate satisfactorily until the above-mentioned steady state is established. If new electrode caps are used, this steady state must be established by the performance of a few hundred welds. If used electrode caps are subjected to machining or to known reconditioning processes, the surface of the electrode caps is ablated or altered precisely in the area stabilized by alloying or diffusion, so that, on the one hand, the steady state must first be restored, and on the other hand the ablation of the material might possibly terminate at a hardness sink, which will result in increased wear when the cap is reused. The reconditioning of the invention, however, leaves the electrode caps unaltered, especially in the active area of its working surfaces, so that the steady state already brought about by prior use is preserved and therefore is already available when the cap is returned to service.

These phenomena, which are observable in the welding of sheet steel, occur to a greater extent in the welding of coated sheet metals, such as sheet metal coated with aluminum, galvanized sheet metal, or sheet metal provided with other metal or conductive plastic coatings. When such metals are welded with fresh electrode caps or those reconditioned by machining, it is observed, for example, that the coatings, which are intended to improve the corrosion resistance and other properties of the sheet metals, are more greatly ablated precisely in the area of contact with the electrode caps, and therefore give rise to rust spots, for example, while this is observed not at all or only occasionally when the electrode caps reconditioned in accordance with the invention are used. Here, again, an explanation is seen in the fact that an electrode already provided with an alloy layer, e.g., one reconditioned in accordance with the invention, has little tendency to ablate zinc or aluminum by diffusion from the sheet metal being welded, while new electrode caps or those reconditioned by machining, in which such alloy layers first have to be formed, are still unsaturated precisely in the course of the first welds, and therefore they can absorb a large amount of the material with which the sheet metal is coated.

The invention is not limited to the embodiments described, which can be modified in many ways. For example, a press could be used, which in contrast to FIGS. 7 and 8, operates horizontally, not vertically. It is furthermore possible in the case of the apparatus of FIG. 8 to move the punch and keep the die stationary. Lastly, in FIGS. 7 and 8, the die could be disposed at the bottom and the punch at the top, and the electrode cap to be reconditioned could be placed not on the punch but into the cavity of the die.

Furthermore, the shape of the reconditioned electrode can be the same as the shape of the original electrode, or it can be different. Finally, the reconditioning method can be performed in more than two steps, if this proves desirable or necessary in order to assure the preservation of the diffusion and/or alloy layers under the working surface or of the deposits on the working surface.

I claim:

1. Method in two stages for reconditioning used spot welding electrodes having bores comprising in the first stage the steps of introducing a first punch having a head which has a slightly smaller external cross-section than the desired internal cross-section of the bore of the reconditioned electrode into a bore of a worn out electrode so that said head projects slightly less than the depth of the desired bore of the reconditioned electrode, pressing said worn out electrode by means of said first punch into a first die having a die bore of a slightly wider cross-section than the desired reconditioned electrode, during which pressing step the die being self-aligning to the electrode, and moving a slidably mounted concave front end die portion in the die bore and pressing said die portion against the worn out electrode to reform it to a desired shape, said method in the second stage further comprising the steps of introducing a second punch having a head which has the same cross-section and length as the desired bore of the reconditioned electrode into the bore of the electrode prepared in said first stage, and pressing said prepared electrode by means of said second punch into a second die corresponding in shape to the desired reconditioned electrode while the second die is self-aligning to the electrode.

* * * * *